J. H. CLOSE.
Plow.
No. 223,708.  Patented Jan. 20, 1880.
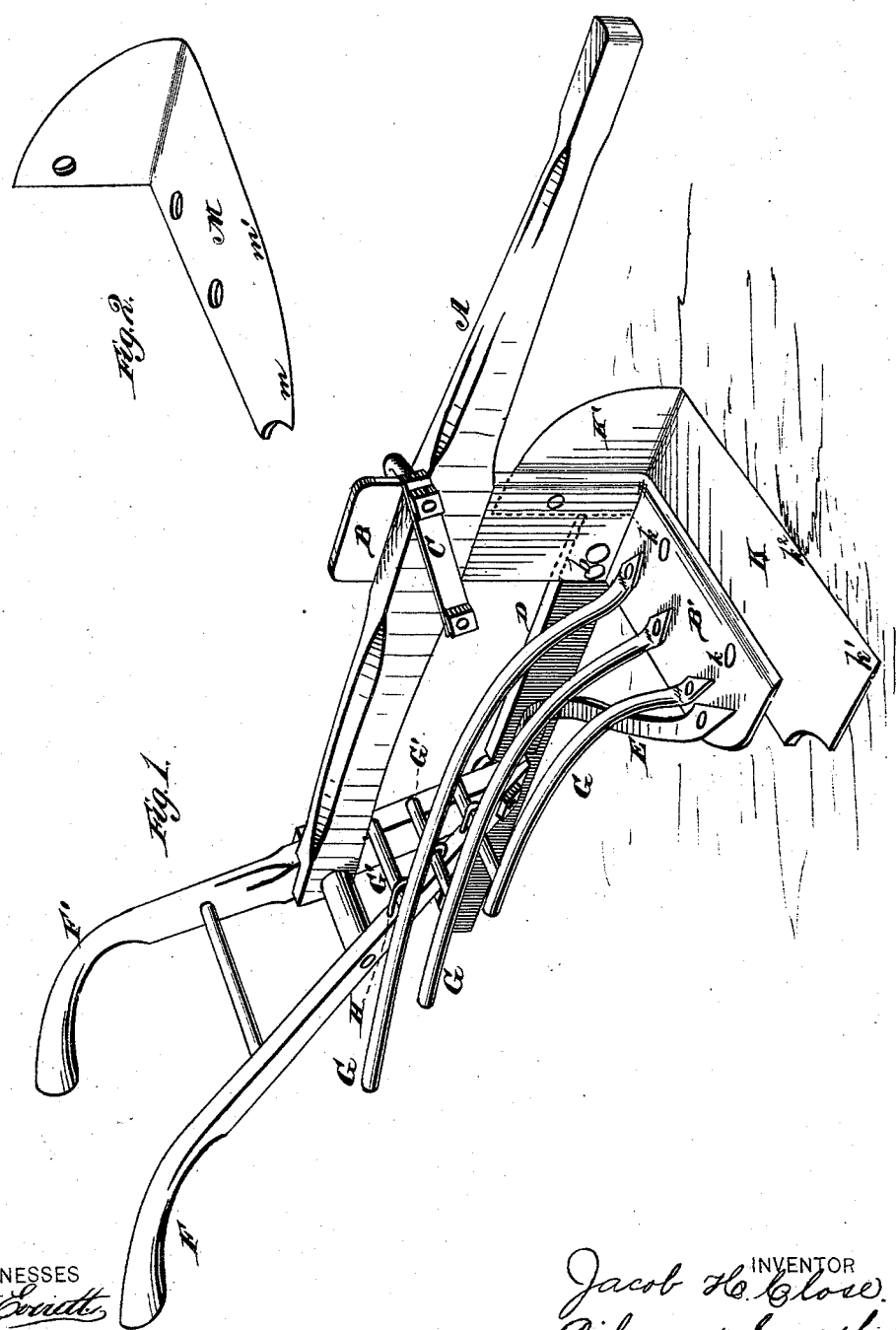
WITNESSES
INVENTOR
Jacob H. Close.
Gilmore Smith & Co.
ATTORNEYS ered at the will of the operator, and to suit the conditions of the soil and the strength of his team.

UNITED STATES PATENT OFFICE.

JACOB H. CLOSE, OF PHILLIPSBURG, KANSAS.

PLOW.

SPECIFICATION forming part of Letters Patent No. 223,708, dated January 20, 1880.

Application filed May 24, 1879.

*To all whom it may concern:*

Be it known that I, JACOB H. CLOSE, of Phillipsburg, in the county of Phillips and State of Kansas, have invented certain new and useful Improvements in Plows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective of my plow, and Fig. 2 is a view of the lay.

My invention relates to certain improvements in plows, which will be hereinafter fully described, and particularly pointed out in the claim.

A represents the beam of a plow. B is the standard of the plow, which is formed of one piece with B', which is the base or frog of the plow, these two arms of this one plate being formed at right angles with each other. The standard is rigidly attached to the beam by means of the clamp C.

D is the land-side of the plow, and is attached to the standard B by means of the bolts $b$. E is a brace extending from the rear part of the land-side to the outer part of the frog or base-piece B'. F F' are the handles of the plow, and G are bars so curved and attached to the frog B' as to serve as mold-boards to the sod. These bars are adjustably attached to the handle F of the plow by means of the arms G', which are extended nearly at right angles from the bars G, and located just in front of the handle F. These arms are rigidly attached to the bars and are embraced by the hook-bolts H. The stems of these hook-bolts pass through the handle F, and are threaded and provided with nuts, by which the hooks are drawn down firmly upon the arms G', and the bars G may thus be held in any desired position.

K is the lay or share, provided with the colter K', and attached to the frog B' by a series of bolts, $k$. This share K is so formed and set upon the frog B' that its outer corner, $k'$, of the cutting-edge $k^2$ is in advance of a right-angled line with the beam of the plow.

The advantage of this construction provides for a cutting-angle to the share, the force of the draft and resistance of the cut causing the land-side of the plow to run clear, thus avoiding side pressure and consequently providing a plow of lighter draft than the common sod-plow.

M is a lay or share with the outer corner, $m$, cut away and rounded off, and the cutting-line $m'$ receding rearward from a right-angled line from the beam, or a line angled the reverse from the cut line of the lay or share K.

It is found in working this class of plows that where the ground is wet the roots accumulate upon the cutting-edges of all shares or lays that are not on an angle or incline and clog the plow.

I have discovered by experience that when the ground is wet the roots clog in the corner at the base of the colter of the lay or share K. To avoid this I have devised and constructed the lay M for wet plowing. The side draft occasioned by this change of lays can be avoided by changing the position of the clevis-bolt.

The bolts $k$ are threaded to engage the threaded holes in the frog B', and the vertical line of the colter $k^3$ engages the front end of the land-side, which serves the purposes of a shoulder to support the share.

The mold-bars G are made adjustable, so as to produce a satisfactory turning of the sod, whether the sod be wet or dry, wide or narrow, thick or thin, all of which conditions are practicable at the will of the operator, and to suit the conditions of the soil and the strength of his team.

I am aware that an adjustable skeleton mold-board is not broadly new, and I do not therefore claim it, except in connection with the novel elements of my invention.

Having thus described my invention, what I claim as new, and desire to secure by Letters Patent, is—

In a sod-plow, the beam A and standard B, having the frog B' formed in one piece therewith and adapted to receive the skeleton mold-board, in combination with the share K, having colter K' and advanced point $k'$, secured to the land-side of the standard B and the under side of the frog B' by bolts $k$, substantially as and for the purposes set forth.

In testimony that I claim the above I have hereunto subscribed my name in the presence of two witnesses.

JACOB H. CLOSE.

Witnesses:
J. H. CLEAR,
JAMES J. SHEEHY.